(12) United States Patent
Parashurama et al.

(10) Patent No.: US 11,586,265 B2
(45) Date of Patent: Feb. 21, 2023

(54) VOLTAGE DROOP MANAGEMENT THROUGH MICROARCHITECTURAL STALL EVENTS

(71) Applicant: International Business Machines Corporation, Armonk, NY (US)

(72) Inventors: Pradeep Bhadravati Parashurama, Bhadravati (IN); Alper Buyuktosunoglu, White Plains, NY (US); Ramon Bertran Monfort, New York, NY (US); Tobias Webel, Schwaebisch-Gmuend (DE); Martin Recktenwald, Schoenaich (DE); Preetham M. Lobo, Bangalore (IN); Srinivas Bangalore Purushotham, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/349,476

(22) Filed: Jun. 16, 2021

(65) Prior Publication Data
US 2022/0404886 A1 Dec. 22, 2022

(51) Int. Cl.
*G06F 1/30* (2006.01)
(52) U.S. Cl.
CPC .................. *G06F 1/305* (2013.01)
(58) Field of Classification Search
CPC ................................................ G06F 1/305
See application file for complete search history.

(56) References Cited

U.S. PATENT DOCUMENTS

| | | | |
|---|---|---|---|
| 9,595,508 B2 | 3/2017 | Xu | |
| 10,171,081 B1 | 1/2019 | Bose | |
| 10,552,250 B2 | 2/2020 | Biran | |
| 11,029,742 B2 | 6/2021 | Webel | |
| 2007/0192636 A1* | 8/2007 | Gonzalez | G06F 1/28 713/300 |
| 2009/0063065 A1* | 3/2009 | Weekly | G06F 1/3237 702/64 |
| 2009/0063884 A1* | 3/2009 | Weekly | G06F 1/28 713/340 |

(Continued)

OTHER PUBLICATIONS

Berry et al., "IBM z14: Processor Characterization and Power Management for High-Reliability Mainframe Systems," IEEE Journal of Solid-State Circuits, vol. 54, Issue 1, Jan. 2019, 12 pages. <https://ieeexplore.ieee.org/abstract/document/8533619>.

(Continued)

*Primary Examiner* — Mark A Connolly
(74) *Attorney, Agent, or Firm* — Richard B. Thomas

(57) ABSTRACT

Embodiments relate to a system, program product, and method for proactively initiating throttle action on one or more cores in a multicore processing device to mitigate voltage droop therein. The method includes determining, in real-time, an indication of stall events within the core and determining one or more resolutions of the stall events. The method also includes determining, in real-time, a timing margin value for the core and predicting inducement of a voltage droop on the core. The method further includes integrating the resolutions of the stall events and the timing margin value for the core, determining, subject to the predicting, a throttle action for the core, and executing the throttle action on the core.

20 Claims, 9 Drawing Sheets

(56) References Cited

U.S. PATENT DOCUMENTS

2013/0318364 A1 11/2013 Berry, Jr.
2019/0146569 A1 5/2019 Nge
2021/0116982 A1* 4/2021 Khanna ................ G06F 1/3203

OTHER PUBLICATIONS

Kalyanam et al., "A Proactive Voltage-Droop-Mitigation System in a 7nm Hexagon™ Processor," 2020 IEEE Symposium on VLSI Circuits, Jun. 16-19, 2020, 2 pages. <https://ieeexplore.ieee.org/document/9162808>.

Mell et al., "The NIST Definition of Cloud Computing," Recommendations of the National Institute of Standards and Technology, U.S. Department of Commerce, Special Publication 800-145, Sep. 2011, 7 pages.

Reddi et al., "Predicting Voltage Droops Using Recurring Program and Microarchitectural Event Activity," IEEE Micro, vol. 30, Issue 1, Jan.-Feb. 2010, pp. 101-109. <https://ieeexplore.ieee.org/document/5430744>.

* cited by examiner

VOLTAGE DROOP MANAGEMENT THROUGH MICROARCHITECTURAL STALL EVENTS

BACKGROUND

The present disclosure relates to proactive voltage droop mitigation in one or more processor cores, and, more specifically, to proactively initiating throttle actuation on the cores in a multicore processing device to mitigate and/or prevent voltage droop.

Many known modern processing devices include multiple cores that are powered through a steady-state power source. As the processing loads on the cores vary, the supply voltage to the cores may dip, i.e., droop for increased loading on one or more of the cores, thereby creating an environment conducive to microarchitectural processor stall events.

SUMMARY

A system, computer program product, and method are provided for proactive voltage droop mitigation in one or more processor cores.

In one aspect, a computer system is provided for proactively initiating throttle action on one or more cores in a multicore processing device to mitigate voltage droop. The system includes one or more memory devices communicatively and operably coupled to the multicore processing device. The system includes a predictive voltage droop management system at least partially embedded within the one or more memory devices. The predictive voltage droop management system includes one or more core throttling circuits. The predictive voltage droop management system is configured to determine, in real-time, an indication of one or more stall events within the one or more cores, and determine one or more resolutions of the one or more stall events. The predictive voltage droop management system is also configured to determine, in real-time, a timing margin value for the one or more cores, and predict inducement of a voltage droop on the one or more cores. The predictive voltage droop management system is further configured to integrate the one or more resolutions of the one or more stall events and the timing margin value for the one or more cores. The predictive voltage droop management system is also configured to determine, subject to the prediction, a throttle action for the one or more cores, and execute, through the one or more core throttling circuits, the throttle action on the one or more cores.

In another aspect, a computer program product embodied on at least one computer readable storage medium having computer executable instructions for proactively initiating throttle action on one or more cores in a multicore processing device to mitigate voltage droop that when executed cause one or more computing devices to determine, in real-time, an indication of one or more stall events within the one or more cores, determine one or more resolutions of the one or more stall events, determine, in real-time, a timing margin value for the one or more cores, predict inducement of a voltage droop on the one or more cores including integration of the one or more resolutions of the one or more stall events and the timing margin value for the one or more cores, determine, subject to the prediction, a throttle action for the one or more cores, and execute the throttle action on the one or more cores.

In yet another aspect, a computer-implemented method is provided for proactively initiating throttle action on one or more cores in a multicore processing device to mitigate voltage droop therein. The method includes determining, in real-time, an indication of stall events within the core and determining one or more resolutions of the stall events. The method also includes determining, in real-time, a timing margin value for the core and predicting inducement of a voltage droop on the core. The method further includes integrating the resolutions of the stall events and the timing margin value for the core, determining, subject to the predicting, a throttle action for the core, and executing the throttle action on the core.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
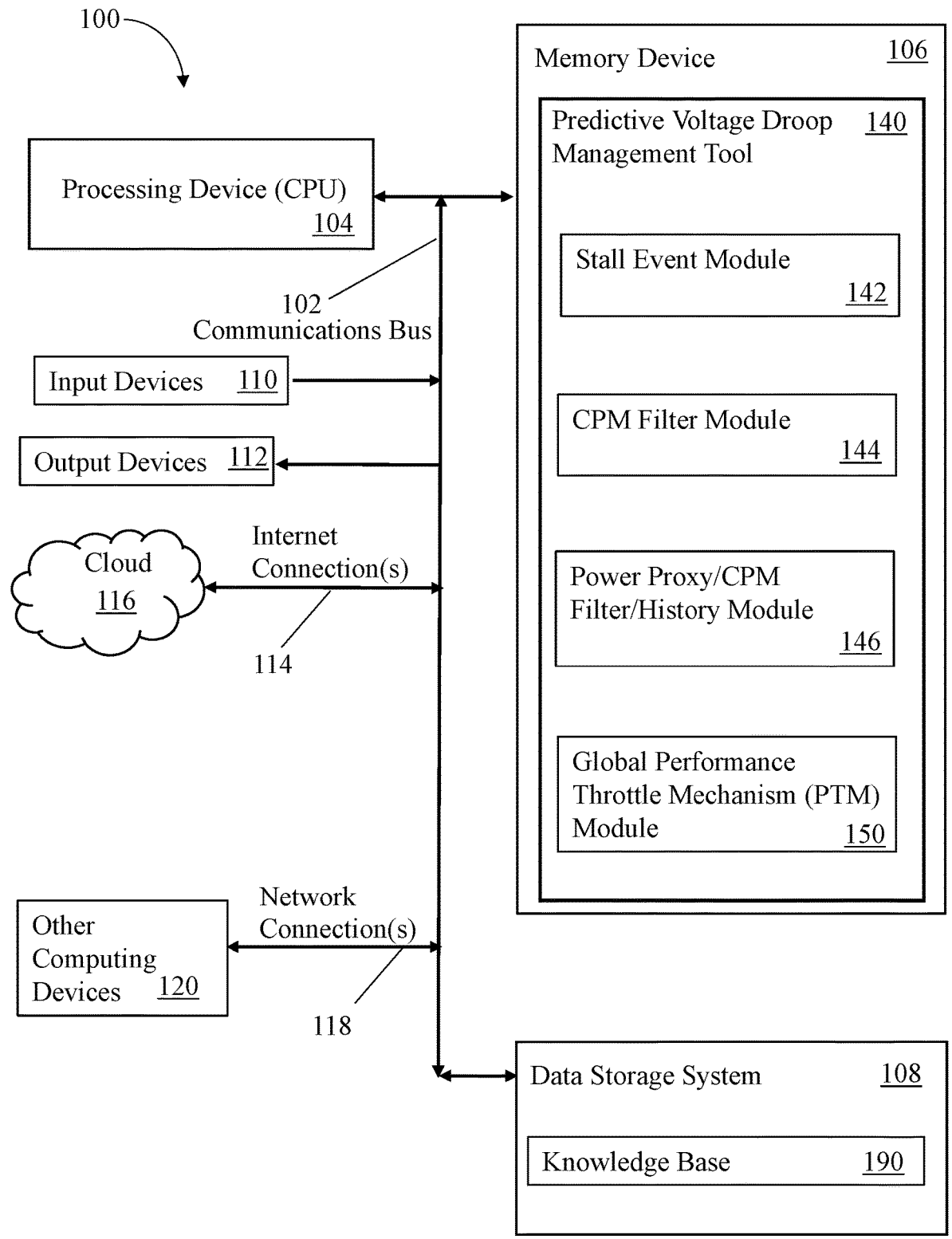
FIG. 1 is a block schematic diagram illustrating a computer system configured for proactively initiating throttle action on the cores in a multicore processing device to mitigate and/or prevent voltage droop, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to proactively initiating throttle action on the cores in a multicore processing device to mitigate and/or prevent voltage droop. While the present disclosure is not necessarily limited to such applications, various aspects of the disclosure may be appreciated through a discussion of various examples using this context.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Many known modern processing devices, sometimes referred to as central processing units, or CPUs, are positioned on a single chip (or die, where the terms are used interchangeably herein) as an integrated circuit. Many of these known CPUs are multicore processors, i.e., a computer processor on a single integrated circuit with two or more separate processing units, called cores, each of which reads and executes program instructions. These multiple cores may be powered through a steady-state power source. As the processing loads on the cores vary, a sudden change in the core activity of a computer processor can result in a relatively large increase in the current drawn from the power source. Such large current increases drawn from the power source may induce a voltage droop in the computer processor due to inductive noise therein. Voltage droop refers to the reduction in available electric current in an electric circuit to process the present loading on one or more of the processing cores that is manifested as a reduction in the supply voltage to the cores. If the multiple cores in a multicore processor change from relatively low activity to relatively high activity in a relatively small interval of time, the voltage droop observed at all processor cores may be relatively significant. In some situations, the voltage droop may be significant enough to exceed an established threshold and thereby induce a microarchitectural stall event. Such a stall event is sometimes referred to as a pipeline stall, where the execution of instructions is delayed and, in some instances, the chip might shift into a non-functional state, i.e., potentially lead to a core shut-down event. At least one known type of stall events includes large stall events that have features that include, without limitation, one or more operations that include extended latencies.

Many of the known multicore processors include one or more critical path monitor (CPM) sensors placed at various locations in each processor core to act as monitors of voltage droop for the respective processor core. In a computer processor with a single clock-grid for all cores, the CPM sensors can determine the available timing margins at all the cores. The available timing margin is the difference between the time of an actual change in an electric signal and the latest time at which the electric signal can change and continue to have the electronic circuit to function correctly. Further, the available timing margin is inversely proportional to the amount of voltage at the core. Thus, the lower the available timing margin is, the lower the voltage at the core. As such, a relatively low available timing margin can indicate a voltage droop.

To combat voltage droop, it is possible to trigger circuits that throttle the processor core through one or more throttle actions. Throttling the processor core can reduce how quickly the processor core executes instructions. Throttling the processor core when voltage droop occurs can help the core to continue executing the respective instructions even with a reduced voltage. In this way, throttling the processor core can prevent the processor core from failing. However, from the time at which the processor activity increases until the point in time when the CPM sensors respond to the voltage droop event, there can be a certain amount of latency, i.e., delay, e.g., 40 to 50 processor clock-cycles. If the voltage droop is relatively large, e.g., a mid-frequency droop rate of about 100 millivolts (mV)/10 nanoseconds (ns), the CPM sensors may not be able to activate the core throttling circuits in time to prevent an induced microarchitectural stall event resulting in a core shutdown. Therefore, reliance on voltage sensing alone may not prevent microarchitectural stall events.

A system, computer program product, and method are disclosed and described herein for proactively initiating throttle action on the cores in a multicore processing device to mitigate and/or prevent voltage droop. The system, computer program product, and method are configured to identify probable large stall events, i.e., those events associated with extended latency operations, referred to herein as stall events, where early identification of such events facilitates early initiation of preemptive proactive mechanisms to mitigate the operational impacts of the events. These stall events have typically been previously encountered and a substantial amount of data has been collected for at least some of the instances of the stall events previously experienced. Such data includes, without limitation, identification of the associated instructions that can induce the stall events and one or more previously generated resolutions to the stall events to mitigate, or recover from, any deleterious operational impacts associated with the stall events. Such stall events include, without limitation, L2 instruction and/or cache misses, low frequency events followed by a power surge (i.e., cold-to-hot events), high frequency events (i.e., a short drop in power followed by a quick power ramp-up), thread balancing resets, instruction cache and/or instruction completion stalls, and translation lookaside buffer misses. The collected event and resolution data are leveraged as direct indicators of respective processor activity changes to predict and identify imminent stall events.

In some embodiments, the system is a predictive voltage droop management system configured to assert the occurrence of a stall event at the incipient stage within the processing pipeline in real-time. In at least some embodiments, the indication of one or more stall events directed toward one or more processor cores is sufficient to trigger a mild throttling of instruction execution on the affected cores, or, in some embodiments, all of the cores of the affected multicore processor. However, in at least some instances, given the current conditions of the multicore processor, for example, a relatively light instruction processing load, such throttle action may not be necessary for that particular event at that particular point in time. As such, measuring just the change of the processor performance due to the known resolution of the respective stall events will not be a true indicator of a significant "voltage droop" event, because the resolution of particular stall events in one core do not reflect on the state of all other the cores. If the voltage signals from the affected and non-affected cores do not indicate an impending voltage droop event, the throttling can be suspended. On the other hand, if the voltage measurements of the affected cores indicate an imminent voltage droop, the light throttling may be increased to heavy throttling. Therefore, a throttle action for the full suite of cores in the multicore processor due solely to an indicated occurrence of a stall event at the incipient stage may unnecessarily inhibit the performance thereof.

In at least some embodiments, the predictive voltage droop management system validates and supplements the previously described stall event information with one or more of CPM filter/history logic and power proxy filter/history logic. For those embodiments of multicore processors where the processor-chip includes a single clock-grid for all cores, the respective CPMs indicate the available timing margin that is directly proportional the voltage at that core. The timing margin defines the difference between the actual change in a signal, i.e., voltage, and the latest time at which the voltage can change in order for an electronic circuit, i.e., the respective processor cores, to function correctly. Therefore, for those conditions where a stall event is detected and the CPM measurements are sufficiently low (i.e., below a threshold value), the integration of the identification of the respective resolution of the stall event and the CPM-based voltage measurements (where the CPM measurements act as a real-time timing margin indicator) is sufficient to generate a predictive determination of the imminent inducement of a voltage droop, and provides sufficient time for the throttle actuation circuits to prevent the droop.

In addition, some embodiments also include integrating historical voltage behavior as measured through the CPMs and historical power proxy behavior to further validate the prediction of the voltage droop requiring actuation of the throttle circuits. Therefore, for such embodiments, if there is a stall event and the indicated timing margin is low enough, and the histories of power proxy behavior and CPM behavior indicate a low power phase before the impending stall event such that a voltage droop is imminent, throttling is actuated at each core.

Referring to FIG. 1, a block schematic diagram is provided illustrating a computer system, i.e., a predictive voltage droop management system 100 (herein referred to as "the system 100") that is configured for proactive voltage droop mitigation in one or more processor cores, and, more specifically, to proactively initiating throttle action on the cores in a multicore processing device to mitigate and/or prevent voltage droop, in accordance with some embodiments of the present disclosure. The system 100 includes one or more processing devices 104 (only one shown) communicatively and operably coupled to one or more memory devices 106 (only one shown). The processing device 104 is a multicore processing device. The system 100 also includes a data storage system 108 that is communicatively coupled to the processing device 104 and memory device 106 through a communications bus 102. The system 100 further includes one or more input devices 110 and one or more output devices 112 communicatively coupled to the communications bus 102. In addition, the system 100 includes one or more Internet connections 114 (only one shown) communicatively coupled to the cloud 116 through the communications bus 102, and one or more network connections 118 (only one shown) communicatively coupled to one or more other computing devices 120 through the communications bus 102. In some embodiments, the Internet connections 114 facilitate communication between the system 100 and one or more cloud-based centralized systems and/or services (not shown in FIG. 1).

In at least some embodiments, the system 100 is a portion of a cloud computing environment (see FIG. 6), e.g., and without limitation, system 100 is a computer system/server that may be used as a portion of a cloud-based systems and communications environment through the cloud 116 and the Internet connections 114. In one or more embodiments, a predictive voltage droop management tool 140, herein referred to as "the tool 140", is resident within the memory device 106 to facilitate proactive voltage droop mitigation in one or more processor cores. The tool 140 communicates with the multicore processing device 104 through the communications bus 102.

In one or more embodiments, the tool 140 includes a stall event module 142 configured to determine, in real-time, the indications of one or more stall events within one or more cores of the multicore processing device 104 and determining one or more resolutions of the indicated stall events from one or more of known indications thereof and previous occurrences thereof. In at least some embodiments, the stall event module 142 is further configured to generate a prediction of an imminent stall event at least partially based on the real-time data that may indicate an incipient stall event and the respective resolution data.

The tool 140 also includes a CPM filter module 144 configured to determine if certain predefined prerequisites for a voltage droop are present or anticipated. The CPM filter module 144 is also configured to determine, in real-time, a timing margin value for the cores of the multicore processing device 104. The CPM filter module 144 is further configured to facilitate predicting inducement of a voltage droop though determining, subject to the resolutions of the respective stall events, the timing margin value with respect to a predetermined threshold value through a predetermined number of cycles. In addition, the CPM filter module 144 is configured to facilitate determining a throttle action for the full set of cores for the multicore processing device 104 through the determining that the aforementioned timing margin value is below the predetermined threshold value.

In at least some embodiments, the tool 140 includes a power proxy/CPM filter/history module 146 (herein referred to as "the PP/CPM module 146") that is configured to determine estimated historical electric power consumption values and historical voltage measurement values for each of the cores of the multicore processing device 104. The PP/CPM module 146 is also configured to integrate the one or more historical electric power consumption values and the one or more historical voltage measurement values. The PP/CPM module 146 is further configured to determine, subject to the integrating of the one or more historical electric power consumption values and the one or more historical voltage measurement values, a low power condition in the one or more cores of the multicore processing device 104.

The tool 140 also includes a global performance throttle mechanism (PTM) module 150 that is configured to predict inducement of a voltage droop on at least one of the cores of the multicore processing device 104 through integrating the one or more resolutions of the one or more stall events and the timing margin value for the affected cores of the multicore processing device 104. The PTM module 150 is also configured to determine, subject to the aforementioned predicting, a throttle action for the full set of cores for the multicore processing device 104 and executing the throttle action for the full set of cores for the multicore processing device 104. More specifically, the PTM module 150 is configured to suspend execution of presently pending instructions in all of the cores of the multicore processing device 104. Moreover, the PTM module 150 is configured to prevent, or block, initiation of any throttle action, i.e., throttling on any of the cores for the multicore processing device 104 for the duration of the present execution of the stall events.

In at least some embodiments, the data storage system 108 provides storage to, and without limitation, a knowledge base 190 that includes the data associated with known stall events, including, without limitation, indications of the stall events in progress at the incipient stages or later as well as the resolution for each of the known stall events. The knowledge base 190 also maintains the data associated with the certain predefined prerequisites for voltage droop events, the data associated with the generated predictions of potential voltage droop events, and the data associated with historical voltage droop events including, without limitation, magnitude of the voltage droop and duration. The knowledge base 190 further maintains the data associated with the timing margin values as well as the associated predetermined threshold values thereof and the associated predetermined number of cycles. Moreover, the knowledge base 190 maintains the data associated with the historical electric power consumption values and the historical voltage measurement values for each of the cores of the multicore processing device 104. In addition, the knowledge base 190 maintains the data associated with historical integrations of the historical electric power consumption values and the historical voltage measurement values and any resultant low power conditions for each of the cores of the multicore processing device 104.

Figure 2:
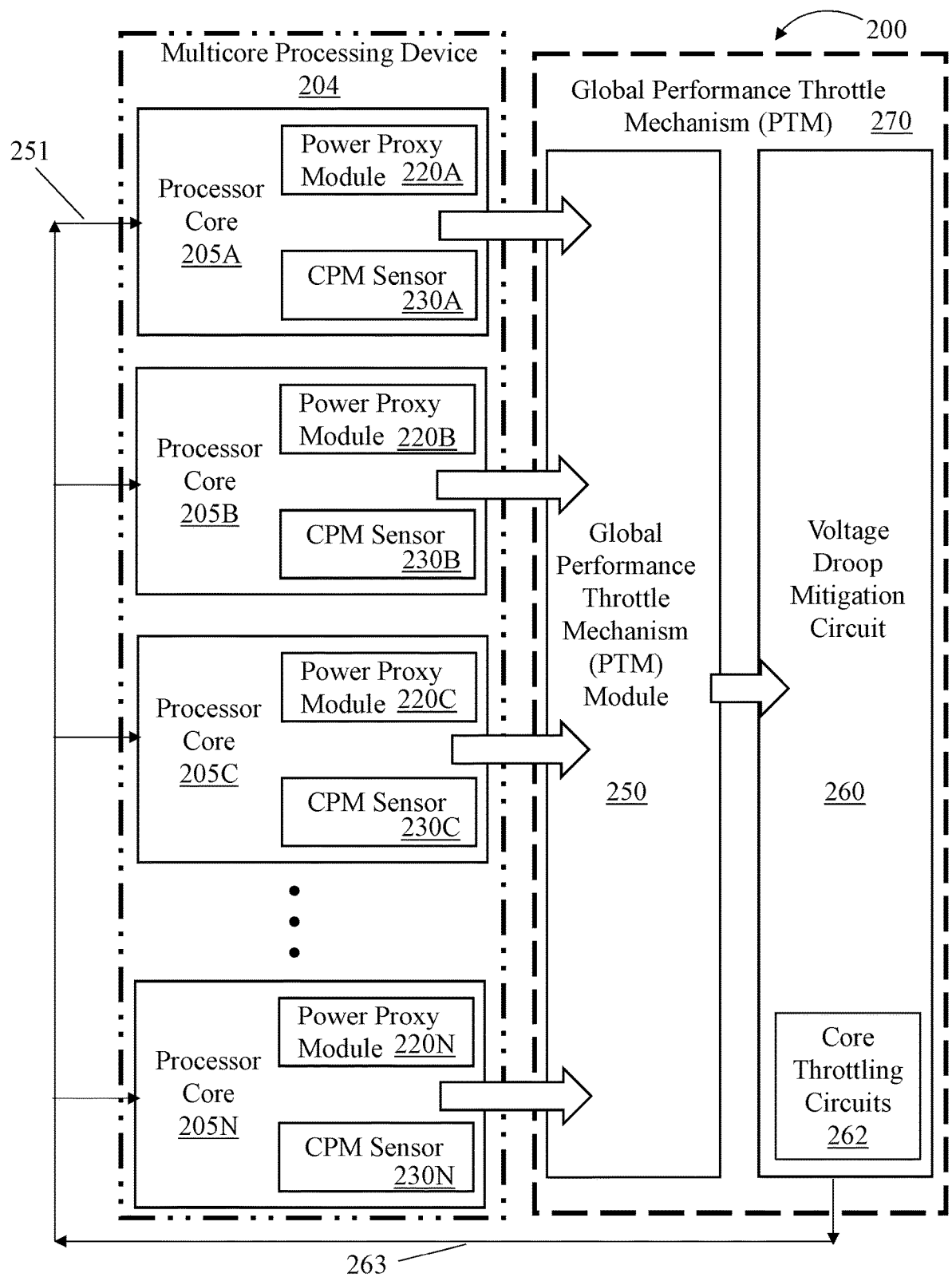
FIG. 2 is a block schematic diagram illustrating the relationships between a multicore processing device, a global performance throttle mechanism (PTM), and voltage droop mitigation circuit, in accordance with some embodiments of the present disclosure.

Referring to FIG. 2, a block schematic diagram is presented illustrating the relationships 200 between a multicore processing device 204, a global performance throttle mechanism (PTM) module 250, and a voltage droop mitigation circuit 260 (with embedded core throttling circuits 262), in accordance with some embodiments of the present disclosure. The multicore processing device 204 is substantially similar to the multicore processing device 104 (shown in FIG. 1) and includes a plurality of processor cores 205A, 205B, 205C, through 205N (herein collectively referred to as "processor cores 205"). Each of the processor cores 205 includes one or more respective power proxy modules 220A, 220B, 220C, ... 220N (herein collectively referred to as "power proxy modules 220") (only one shown for each processor core 205 in FIG. 2). Each respective power proxy module 220 is configured to estimate the amount of electric power consumed by the respective processor core 205. As processing activity increases in the processor core 205, the amount of electric power consumed will increase, and the estimates of the power proxy modules 220 will indicate a change in the amount of processing activity by the respective cores 205.

Each of the processor cores 205 also includes one or more respective critical path monitor (CPM) sensors 230A, 230B, 230C, ... 230N (herein collectively referred to as "CPM sensors 230") (only one shown for each processor core 205 in FIG. 2). The CPM sensors 230 are placed at various locations in each processor core 205 to act as monitors of voltage droop for the respective processor core 205. The CPM sensors 230 capture real-time voltage information for the respective processor cores 205. In the multicore processing device 204 with a single clock-grid for all processor cores 205, the CPM sensors 230 determine the available timing margin values at all the processor cores 205. The available timing margin is the difference between the time of an actual change in an electric signal and the latest time at which the electric signal can change and continue to have the electronic circuit to function correctly. Further, the available timing margin is inversely proportional to the amount of voltage at the respective processor core 205. Thus, the lower the available timing margin is, the greater the amount of voltage is being consumed at the respective processor core 205. As such, a change in voltage of a processor core 205 will indicate a change in the processor core's 205 processing activity, and a relatively low available timing margin will indicate a voltage droop.

The processor cores 205 are communicatively and operably coupled to a global performance throttle mechanism (PTM) module 250 (herein referred to as "the PTM module 250") that is substantially similar to the global PTM module 150 (shown in FIG. 1). The PTM module 250 is configured to predict inducement of a voltage droop on at least one of the processor cores 205 of the multicore processing device 204 through integrating the one or more resolutions of the one or more stall events and the timing margin value for the affected processor cores 205 of the multicore processing device 204. The PTM module 250 is also configured to determine a throttle action, subject to the aforementioned prediction, for the full set of processing cores 205 for the multicore processing device 204 and executing the throttle action for the full set of processing core 205 through a voltage droop mitigation circuit 260 that is communicatively and operably coupled to the PTM module 250. More specifically, the PTM module 250 is configured to suspend execution of presently pending instructions in all of the processing cores 205 of the multicore processing device 204, thereby arresting any further voltage droop. The throttling through the suspension of activity is slowly reduced and performance is restored to approximately 100% of rated capabilities. The temporary suspension of activity is relatively negligible in the normal operation of the affected chip and facilitates extending the service lifetime of the affected chip.

Moreover, the PTM module 250 is configured to prevent, or block, initiation of any throttle action, i.e., throttling on any of the processing cores 205 for the multicore processing device 204 for the duration of the present execution of the respective stall events. In some embodiments, the PTM module 250 and the voltage droop mitigation circuit 260 are combined into a global performance throttle mechanism (PTM) 270. In some embodiments, the PTM module 250 is further configured to sample the estimates of the power proxy modules 220 and the CPM sensors 230 at a predetermined sampling rate to determine if a voltage droop event is indicated. If a voltage droop event is indicated, the PTM module 250 will transmit an appropriate signal to the voltage droop mitigation circuit 260 to actuate the respective core throttling circuits 262 on all the processing cores 205 to transmit a signal 263 to mitigate the voltage droop event.

Figure 3:
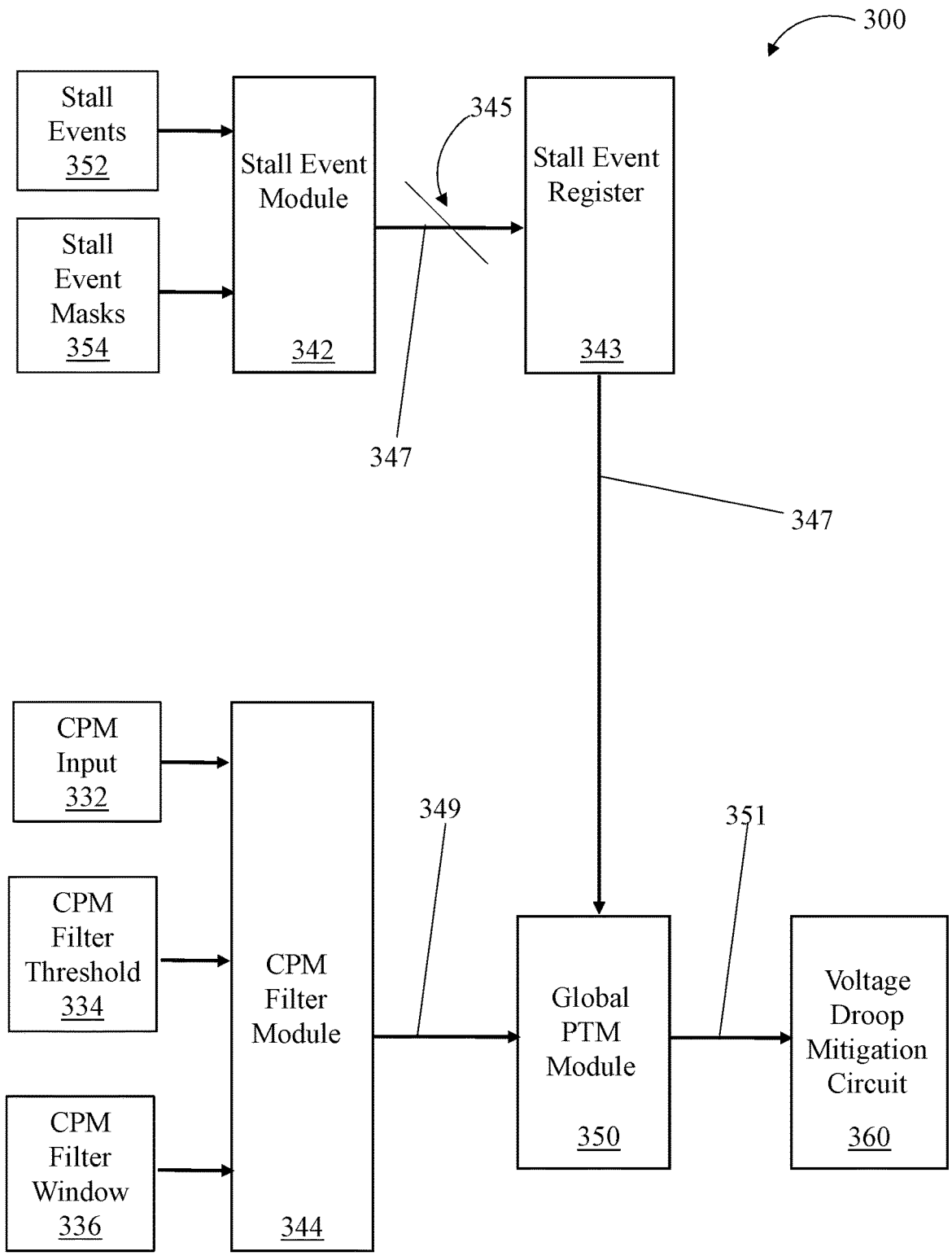
FIG. 3 is a block schematic diagram illustrating a logical circuit configured for proactively initiating throttle action on the cores in a multicore processing device to mitigate and/or prevent voltage droop, in accordance with some embodiments of the present disclosure.

Referring to FIG. 3, a block schematic diagram is presented illustrating a logical circuit 300 configured for proactively initiating throttle action on the processor cores 205 in the multicore processing device 204 (both shown in FIG. 2) to mitigate and/or prevent voltage droop, in accordance with some embodiments of the present disclosure. The logical circuit 300 includes features that facilitate filtering any unwanted stall events for those instances where throttling of the multicore processing device 204 is unnecessary.

In one or more embodiments, the stall event module 342 is substantially similar to the stall event module 142 (shown in FIG. 1). The stall event module 342 is configured to determine, in real-time, the indications of one or more stall events within one or more cores of the multicore processing device 104 and determining one or more resolutions of the indicated stall events from one or more of known indications thereof and previous occurrences thereof. The stall event module 342 is further configured for receiving real-time data of indications of one or more stall events 352, where the stall event module 342 determines which stall event 352 is determined. Such stall events 352 include, without limitation, L2 instruction and/or cache misses, low frequency events followed by a power surge (i.e., cold-to-hot events), high frequency events (i.e., a short drop in power followed by a quick power ramp-up), thread balancing resets, instruction cache and/or instruction completion stalls, and translation lookaside buffer misses. In addition, the data of the stall events 352 includes the respective resolution data that represents previously generated resolutions to the stall events 352 to mitigate, or recover from, any deleterious operational impacts associated with the stall events 352. The collected event and resolution data are leveraged as direct indicators of respective processor activity changes to predict and identify imminent stall events 352. The stall event module 342 is also configured to receive stall event masks 354 that are based on those stall events 352 that the user will mask from the apparatus and methods described herein to prevent automatic throttling of the multicore processing device 204. The masking feature facilitates filtering any unwanted stall events 352 for those instances where throttling of the multicore processing device 204 is unnecessary.

In at least some embodiments, a gating device 345 (sometimes referred to as a reducer) is configured to allow only one unmasked stall event 352 and respective resolution, i.e., combined event/resolution signal 347 to be transmitted from the stall event module 342 to a stall event register 343. In some embodiments, the stall event register 343 is configured to maintain a single bit of information.

In embodiments, the logical circuit 300 further includes the CPM filter module 344 that is substantially similar to the CPM filter module 144 (shown in FIG. 1). The CPM filter module 344 is configured to determine if certain predefined prerequisites for a voltage droop are present or anticipated, i.e., predicted. The CPM filter module 344 is also configured to determine, in real-time, a timing margin value for the cores of the multicore processing device 204. The CPM filter module 344 is further configured to facilitate predicting inducement of a voltage droop though determining, subject to the resolutions of the respective stall events, the timing margin value with respect to a predetermined timing margin threshold value through a predetermined duration, i.e., a predetermined number of cycles. In addition, the CPM filter module 344 is configured to facilitate determining a throttle action for the full set of processor cores 205 for the multi-core processing device 204 through the determining that the aforementioned timing margin value is below the predetermined threshold value. As such, the CPM filter module 344 is configured to receive the CPM inputs 332 from each of the CPM sensors 230 (shown in FIG. 2) (that represent captured real-time voltage information for the respective processor cores 205), the respective CPM filter thresholds 334 and the respective CPM filter window 336 that represents the predetermined number of cycles for the duration of the respective low voltage conditions below the respective threshold 334 on the respective processor core 205.

The logical circuit 300 also includes the PTM module 350 that is substantially similar to the PTM module 350 (shown in FIG. 2). The PTM module 350 is configured to predict inducement of a voltage droop on at least one of the processor cores 205 of the multicore processing device 204 through integrating the one or more resolutions of the one or more stall events and the timing margin value for the affected processor cores 205 of the multicore processing device 204. The PTM module 350 is configured to determine a throttle action for the full set of processor cores 205 and executing the throttle action for the full set of processor cores 205 through the voltage droop mitigation circuit 360 that is substantially similar to the voltage droop mitigation circuit 260 (shown in FIG. 2). More specifically, the PTM module 350 is configured to suspend execution of presently pending instructions in all of the processor cores 205. Moreover, the PTM module 350 is configured to prevent, or block, initiation of any throttling on any of the cores for the full set of processor cores 205 for the duration of the present execution of the stall events. The PTM module 350 is further configured to sample the filtered output signal 349 of the CPM filter module 344 at a predetermined sampling rate to determine if a voltage droop event is indicated. In addition, the PTM module 350 is configured to receive the combined event/resolution signal 347 from the stall event register 343 and integrate the signal 347 with the filtered output signal 349.

If a stall event 352 is in progress and the combined event/resolution signal 347 and the filtered output signal 349 from the CPM filter module 344 indicate a voltage droop event, the PTM module 350 will transmit an appropriate trigger signal 351 to the voltage droop mitigation circuit 360 to actuate the respective core throttling circuits 262 on all the processing cores 205 to mitigate, and if possible, arrest the voltage droop event. The integration of the filtered output signal 349 from the CPM filter module 344 indicative of a potential voltage droop event and the combined event/resolution signal 347 originating with the stall event module 342 indicative of an actual stall event 352 and its respective resolution facilitates filtering any unwanted stall events from triggering the throttle circuits when the voltage measurements from the respective CPM sensors 230 are reasonably high, i.e., have sufficient timing margin to avoid unnecessary throttling of the processor cores 205. For example, in the event that one of the processor cores 205 begins to draw increased electrical current, thereby decreasing the respective voltage at the affected processor core 205 and decreasing the timing margin for that processor core 205, and the other processor cores 205 are relatively lightly loaded, the logical circuit 300 will leverage the determination of an actual stall event 352 (or, lack thereof) and if the real-time voltage measurements of the affected processor core 205 indicate sufficient timing margin, regardless of the presence of an actual stall event to prevent any unnecessary throttling action on the multicore processing device 204. Accordingly, if the measured conditions warrant, the voltage droop mitigation circuit 360, subject to the trigger signal 351 from the PTM module 350, will operate the throttle circuits to substantially halt execution of the instructions presently present at all of the processor cores 205 of the multicore processing device 204.

Figure 4:
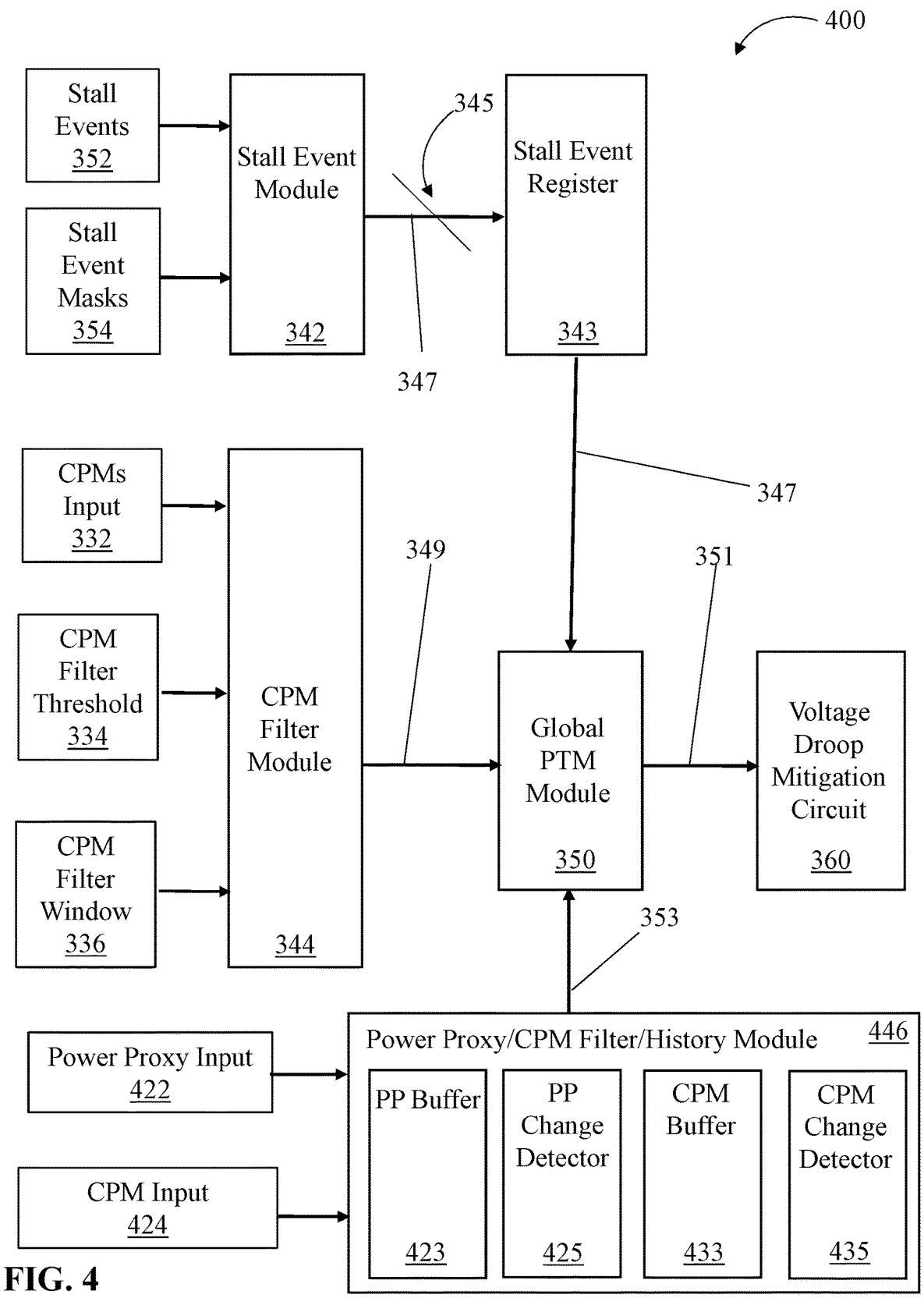
FIG. 4 is a block schematic diagram illustrating a logical circuit configured for proactively initiating throttle action on the cores in a multicore processing device to mitigate and/or prevent voltage droop, in accordance with some embodiments of the present disclosure.

Referring to FIG. 4, a block schematic diagram is presented illustrating a logical circuit 400 configured for proactively initiating throttle action on the processor cores 205 in the multicore processing device 204 (both shown in FIG. 2) to mitigate and/or prevent voltage droop, in accordance with some embodiments of the present disclosure. The logical circuit 400 includes features that facilitate filtering any unwanted stall events for those instances where throttling of the multicore processing device 204 is unnecessary. As shown in FIG. 4, those components from FIG. 3 that are substantially similar are also shown in FIG. 4, where the additional components are shown with new numbering.

In embodiments, a power proxy input 422 represents captured real-time electric power information (i.e., estimates) that is transmitted from the power proxy modules 220 within the processor cores 205 (as shown in FIG. 2) at a predetermined sampling rate. In some embodiments, each output of the respective power proxy modules 220 is processed to determine the estimated electric power draw of the respective processor cores 205. In some embodiments, the outputs of the power proxy modules 220 is summed to determine an estimated real-time electric power draw of the multicore processing device 204 as a whole. In addition, the CPM input 424 represents captured real-time voltage information for the respective processor cores 205 from each of the CPM sensors 230 (shown in FIG. 2) at a predetermined sampling rate.

In at least some embodiments, the logical circuit 400 includes the power proxy/CPM Filter/History Module 446 (herein referred to as "the PP/CPM module 446") that is substantially similar to the PP/CPM module 146 (shown in FIG. 1). The PP/CPM module 446 is configured to determine historical electric power consumption values and historical voltage measurement values for each of the processor cores 205 of the multicore processing device 204. The PP/CPM module 446 is also configured to integrate the one or more historical electric power consumption values and the one or more historical voltage measurement values. The PP/CPM module 146 is further configured to determine, subject to the integrating of the one or more historical electric power consumption values and the one or more historical voltage measurement values, a low power condition in the one or more cores of the multicore processing device 104.

In some embodiments, the PP/CPM module 446 includes one or more power proxy (PP) buffers 423 (only one shown) that are configured to store a predetermined number of the sampled voltage measurement data for storing at least some historical voltage data for each processor core 205. Sufficient logic is available within the PP/CPM module 446 to determine if any respective outlier power proxy values are singular aberrations to be ignored or a part of a trend indicative of operating conditions that are outside of established operating parameters. In some embodiments, and at a predetermined frequency, the buffered power proxy data that is dynamically updated is analyzed for changes by a PP change detector 425 to determine those changes in power that may be indicative of increased loading on the affected processor core 205, and possibly an impending voltage droop event. Any algorithms that analyze the power proxy data using any mathematical processes are employed that enable operation of the PP/CPM module 446, the logical circuit 400, and the system 100 as described herein, including, without limitation, statistical analyses such as grouping, averaging, and mean determination. In some embodiments, less recent historical power proxy data and any associated analyses may be obtained from the knowledge base 190 that maintains the data associated with the historical power proxy estimate values for each of the processor cores 205. Therefore, a substantial amount of power proxy data is available to the PP/CPM module 446 to properly execute the operations and method steps as described herein. Accordingly, the PP/CPM module 446 is configured to generate and transmit a PP/CPM filter/history module output signal 353 that includes power proxy filter/history data to the global PTM module 350 for integration with the combined event/resolution signal 347 transmitted from the stall event register 343 and the filtered output signal 349 transmitted from the CPM filter module 344. As described further herein, the power proxy filter/history data is integrated with CPM filter/history data to generate the transmitted PP/CPM filter/history module output signal 353.

In some embodiments, the PP/CPM module 446 includes edge sampling features that determine if the sampled voltages from the respective CPM sensors 230 fall within a range defined a configurable high-edge value and a configurable low-edge value and then capture the respective highest voltage value and the lowest voltage value within the aforementioned range. In some embodiments, a predetermined number of the sampled voltage measurement data is maintained within one or more CPM buffers 433 (only one shown) for storing at least some historical voltage data for each processor core 205. In some embodiments, select outliers of voltage data either above the high-edge threshold or below the low-edge threshold are discarded. Sufficient logic is available to determine if the respective outlier voltage values are singular aberrations to be ignored or a part of a trend indicative of operating conditions that are outside of established operating parameters. In some embodiments, and at a predetermined frequency, the buffered voltage data that is dynamically updated is analyzed by a CPM change detector 435 for changes to determine those changes in voltage that may be indicative of increased loading on the affected processor core 205, and possibly an impending voltage droop event. Any algorithms that analyze the voltage data using any mathematical processes are employed that enable operation of the PP/CPM module 446, the logical circuit 400, and the system 100 as described herein, including, without limitation, statistical analyses such as grouping, averaging, and mean determination.

In some embodiments, less recent historical voltage data and any associated analyses may be obtained from the knowledge base 190 that maintains the data associated with the historical voltage measurement values for each of the processor cores 205. Therefore, a substantial amount of voltage data is available to the PP/CPM module 446 to properly execute the operations and method steps as described herein. Accordingly, the PP/CPM module 446 is configured to generate and transmit the signal 353 that includes CPM filter/history data to the global PTM module 350 for integration with the combined event/resolution signal 347 transmitted from the stall event register 343 and the filtered output signal 349 transmitted from the CPM filter module 344. As previously described, the CPM filter/history data is integrated with the power proxy filter/history data to generate the transmitted PP/CPM filter/history module output signal 353.

The global PTM module 350 is further configured to integrate the PP/CPM filter/history module output signal 353 with the combined event/resolution signal 347 transmitted from the stall event register 343 and the filtered output signal 349 transmitted from the CPM filter module 344. Accordingly, if the measured conditions and the analyses thereof warrant, the voltage droop mitigation circuit 360, subject to the trigger signal 351 from the PTM module 350, will operate the throttle circuits to substantially halt execution of the instructions presently presented all of the processor cores 205 of the multicore processing device 204.

Figure 5A:
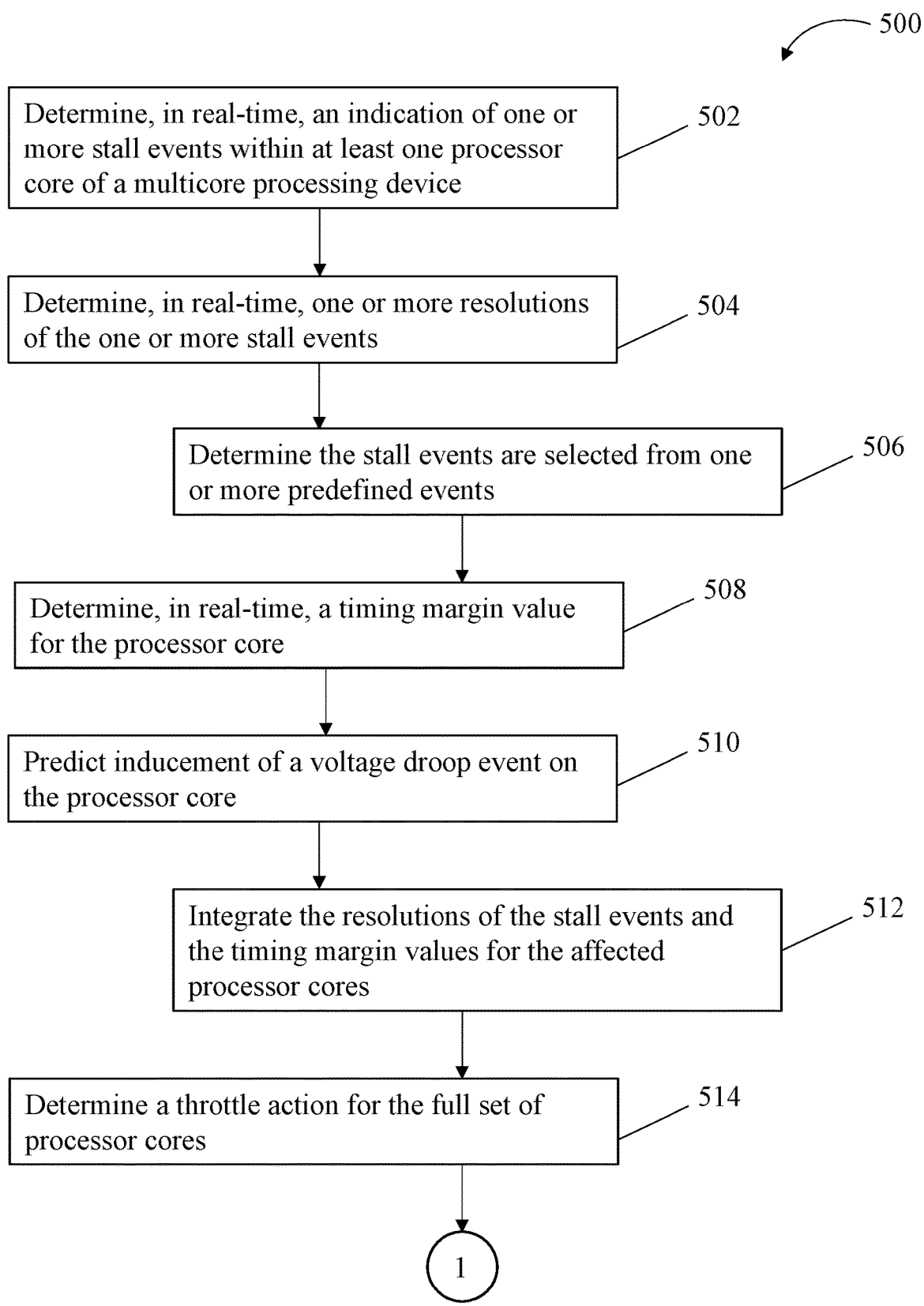
FIG. 5A is a flowchart illustrating a process for proactively initiating throttle action on the cores in a multicore processing device to mitigate and/or prevent voltage droop, in accordance with some embodiments of the present disclosure.

Referring to FIG. 5A, a flowchart is provided illustrating a process 500 for proactively initiating throttle action on the cores in a multicore processing device to mitigate and/or prevent voltage droop, in accordance with some embodiments of the present disclosure. Also referring to FIGS. 1-4, the process 500 includes determining 502, in real-time, through the system 100, and more specifically, the stall event module 342, an indication of one or more stall events 352 within at least one processor core 205 of the multicore processing device 204. The process 500 also includes determining 504, in real-time, one or more resolutions of the one or more stall events 352. Therefore, the data of the stall events 352 includes the respective resolution data that represents previously generated resolutions to the stall events 352 to mitigate, or recover from, any deleterious operational impacts associated with the stall events 352. The determining step 502 includes determining 506 the one or more stall events 352 are selected from one or more predefined events, wherein the one or more predefined events are determined to increase the power consumption of the affected processor core 205 during the execution thereof. Such stall events 352 include, without limitation, L2 instruction and/or cache misses, low frequency events followed by a power surge (i.e., cold-to-hot events), high frequency events (i.e., a short drop in power followed by a quick power ramp-up), thread balancing resets, instruction cache and/or instruction completion stalls, and translation lookaside buffer misses. Therefore, the collected event and respective resolution data are leveraged as direct indicators of respective processor core 205 activity changes to predict and identify imminent stall events 352.

The process 500 further includes determining 508, in real-time, a timing margin value for the at least one processor core 205 of the multicore processing device 204. The voltage measurements from respective CPM sensors 230 indicate the available timing margin that is directly proportional the measured voltage at that processor core 205. The timing margin defines the difference between the actual change in a signal, i.e., voltage, and the latest time at which the voltage can change in order for an electronic circuit, i.e., the respective processor cores 205, to function correctly. Specifically, the CPM filter module 344 receives the CPM inputs 332 from each of the CPM sensors 230 (that represent captured real-time voltage information for the respective processor cores 205), converts the voltage measurements to equivalent timing margin values, receives the respective CPM filter thresholds 334 (that are timing margin thresholds), and receives the respective CPM filter window 336 that represents the predetermined number of cycles for the duration of the respective low voltage conditions/timing margin values below the respective threshold 334 on the respective processor core 205. Therefore, the timing margin value is determined 508 with respect to a predetermined threshold value through a predetermined number of cycles.

The process 500 also includes predicting 510 inducement of a voltage droop event on the processor core 205. In order to facilitate the predicting 510, the PTM module 350 integrates the resolutions of the stall events and the timing margin values for the affected processor cores 205. As such, the PTM module 350 is further configured to sample the filtered output signal 349 of the CPM filter module 344 at a predetermined sampling rate to determine if a voltage droop event is indicated. In addition, the PTM module 350 is configured to receive the combined event/resolution signal 347 from the stall event register 343 and integrate 512 the signal 347 with the filtered output signal 349.

Figure 5B:
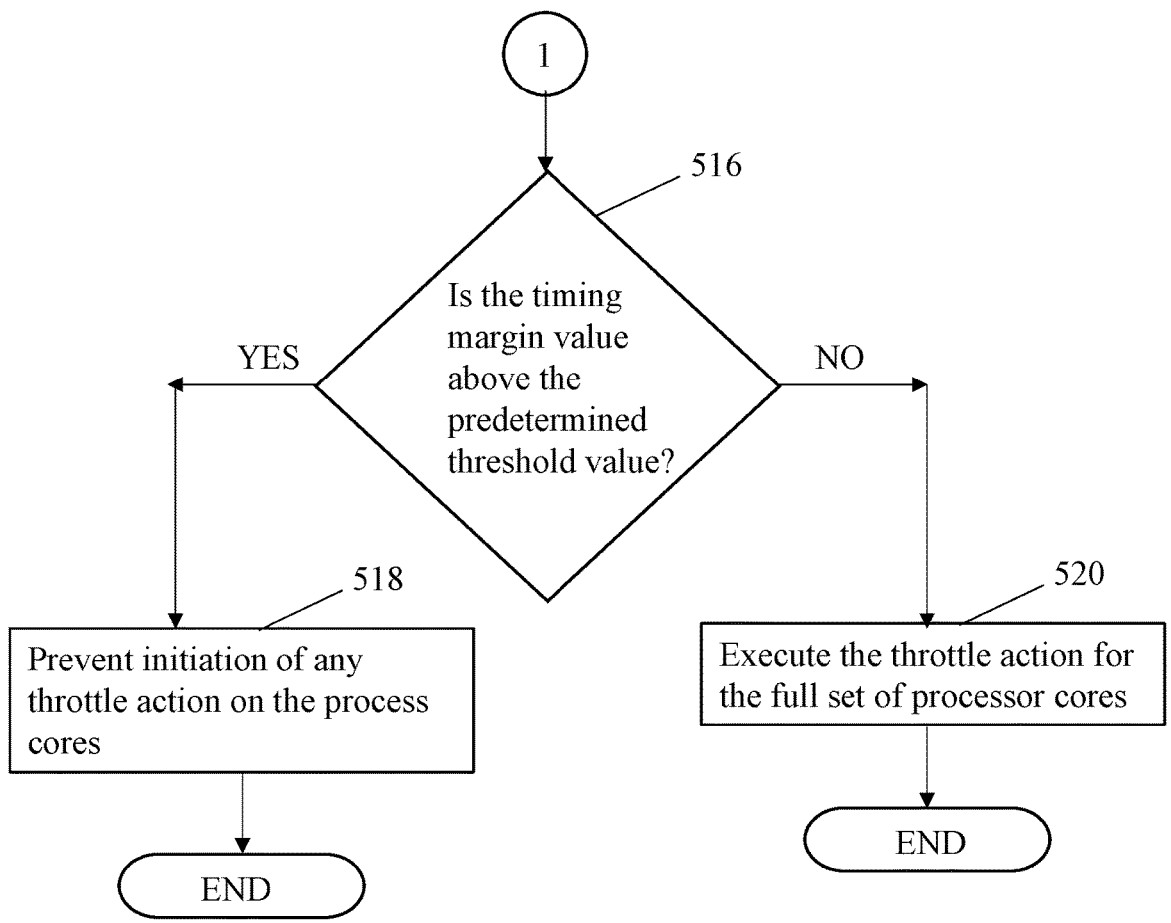
FIG. 5B is a continuation of the flowchart illustrated in FIG. 5A, in accordance with some embodiments of the present disclosure.

Referring to FIG. 5B, a continuation of the flowchart illustrated in FIG. 5A is provided, in accordance with some embodiments of the present disclosure. Continuing to refer to FIGS. 1-5A, the process 500 further includes determining 514, through the PTM module 350, a throttle action for the full set of processor cores 205. The determining 514 step includes determining 516 if the timing margin value is above the predetermined threshold value. If the result of the determination method step 516 is "YES", the process 500 proceeds to executing a throttle action on the multicore processing device 204 that includes preventing 518, or blocking, initiation of any throttling of the processor cores 205 for the duration of the present stall events 352 through not transmitting the trigger signal 351 to the voltage droop mitigation circuit 360. The purpose of this feature in the system 100 is to filter any unwanted stall events 352 from triggering the throttle circuits when the voltage measurements from the respective CPM sensors 230 are reasonably high, i.e., there is sufficient timing margin to avoid unnecessary throttling of the processor cores 205. For example, in the event that one of the processor cores 205 begins to draw increased electrical current, thereby decreasing the respective voltage at the affected processor core 205 and decreasing the timing margin for that processor core 205, and the other processor cores 205 are relatively lightly loaded, the logical circuit 300 will leverage the determination of an actual stall event 352 (or, lack thereof) and if the real-time voltage measurements of the affected processor core 205 indicate sufficient timing margin, regardless of the presence of an actual stall event to prevent any unnecessary throttling action on the multicore processing device 204.

If the result of the determination method step 516 is "NO", i.e., the voltage of the affected processor core 205 is below the threshold time margin value and the affected processor core 205 is in a low power condition, the process 500 proceeds to executing 520 the throttle action for the full set of processor cores 205 through the voltage droop mitigation circuit 360. More specifically, the PTM module 350 transmits the trigger signal 351 to the voltage droop mitigation circuit 360 to suspend execution of presently pending instructions in all of the processor cores 205. Therefore, if a stall event 352 is in progress and the combined event/resolution signal 347 and the filtered output signal 349 from the CPM filter module 344 indicate a voltage droop event, the PTM module 350 will transmit an appropriate trigger signal 351 to the voltage droop mitigation circuit 360 to actuate the respective core throttling circuits 262 on all the processing cores 205 to mitigate, and if possible, arrest the voltage droop event.

In at least some embodiments, the process 500 at the integration method step 512 further includes integrating the PP/CPM filter/history module output signal 353 with the combined event/resolution signal 347 transmitted from the stall event register 343 and the filtered output signal 349 transmitted from the CPM filter module 344 (not shown in FIG. 5A). The PP/CPM filter/history module output signal 353 is generated based on determining historical electric power consumption values and historical voltage measurement values for the processing cores 205.

The system, computer program product, and method as disclosed and described herein are configured for proactively initiating throttle action on the cores in a multicore processing device to mitigate and/or prevent voltage droop. More specifically, the predictive voltage droop management system, computer program product, and method as disclosed and described herein are configured to validate and supplement stall event information with one or more of CPM-based voltage measurements (where the CPM measurements act as a real-time timing margin indicator), CPM filter/history, and power proxy filter/history. A change in voltage of a processor core will indicate a change in the processor core's processing activity, and a relatively low available timing margin will indicate a voltage droop. As such, the integration of the identification of the respective resolutions of the stall events and the CPM-based voltage measurements is sufficient to generate a predictive determination of the imminent inducement of a voltage droop, and provides sufficient time for the throttle actuation circuits to prevent the droop, thereby reducing the possibility of inducement of a microarchitectural stall event resulting in a full shutdown of the affected CPU. The collected event and respective resolution data integrated with the real-time voltage data are leveraged as direct indicators of respective processor core activity changes to predict and identify imminent stall events and associated voltage droop conditions. Therefore, if the measured conditions warrant, a voltage droop mitigation circuit, subject to a trigger signal, will operate throttle circuits to substantially halt execution of the instructions presently present in all of the processor cores of the multi-core processing device. Accordingly, a combination of early detection of incipient or impending stall events due to known indications and associated resolutions and real-time voltage measurements to indicate the present timing margin for the affected processor cores provide additional time relative to known throttling mechanisms to affect a conservative action to either prevent a microarchitectural stall event or ride through a stall event that is known to not pose a microarchitectural stall event threat.

Furthermore, in the event that one of the processor cores begins to draw increased electrical current, the use of the CPM voltage measurements to provide timing margin data in real-time facilitates monitoring a decrease in the respective voltage at the affected processor core with the associated decrease of the timing margin for that processor core. If the other processor cores are relatively lightly loaded, the system described herein will leverage the determination of an actual stall event (or, lack thereof), and if the real-time voltage measurements of the affected processor core indicate sufficient timing margin, regardless of the presence of an actual stall event, any unnecessary throttling action on the multicore processing device will be prevented.

In addition, some embodiments also include integrating historical voltage behavior as measured through the CPMs and historical power proxy behavior to further validate the prediction of the voltage droop requiring actuation of the throttle circuits. Integrating the PP/CPM filter/history with the combined event/resolution and the filtered output from the CPM filter module facilitates including historical electric power consumption values and historical voltage measurement values as a part of the throttling determinations. Therefore, for such embodiments, if there is a stall event and the indicated timing margin is low enough, and the histories of power proxy behavior and CPM behavior indicate a low power phase before the impending stall event such that a voltage droop is imminent, throttling is actuated at each core. Additionally, the added historical data may be sufficient to avoid any throttling actions if the historical data indicates that a significant voltage droop event is not imminent.

Therefore, the embodiments disclosed herein provide an improvement to computer technology. For example, the robust validation mechanisms embedded within the monitoring mechanisms described herein improve identifying those conditions where a stall event is at the incipient stages or imminent and the CPM measurements are sufficiently low (i.e., below a threshold value). The integration of the identification of the respective resolution of the stall event and the CPM-based voltage measurements (where the CPM measurements act as a real-time timing margin indicator) is sufficient to generate a predictive determination of the imminent inducement of a voltage droop, and provides sufficient time for the throttle actuation circuits to prevent the droop. In addition, for those embodiments that also include integrating historical voltage behavior as measured through the CPMs and historical power proxy behavior are leveraged to further validate the prediction of the voltage droop requiring actuation of the throttle circuits. Therefore, for such embodiments, if there is a stall event and the indicated timing margin is low enough, and the histories of power proxy behavior and CPM behavior indicate a low power phase before the impending stall event such that a voltage droop is imminent, throttling is actuated at each core.

Figure 6:
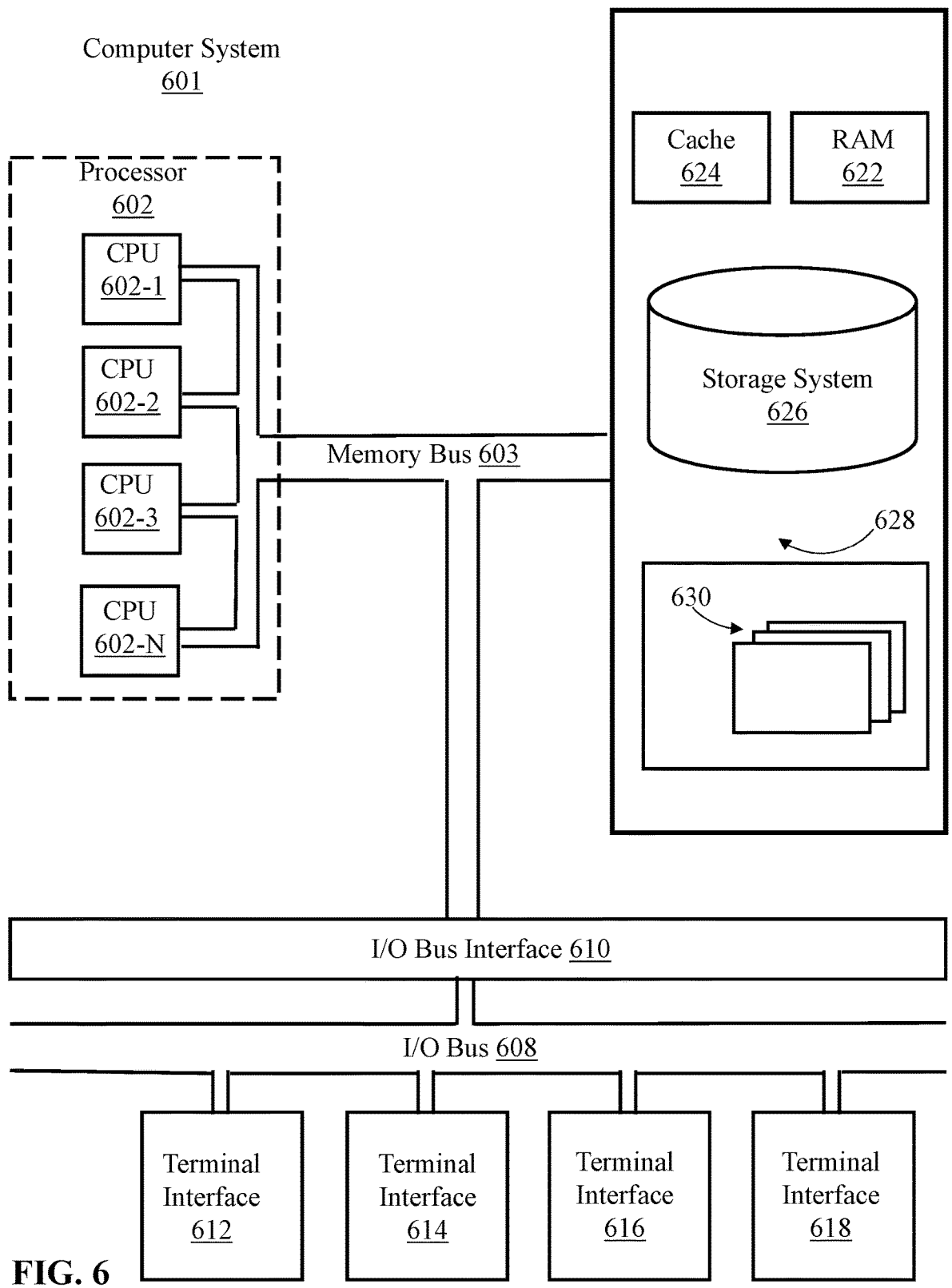
FIG. 6 is a block schematic diagram illustrating a computing system, in accordance with some embodiments of the present disclosure.

Referring now to FIG. 6, a block schematic diagram is provided illustrating a computing system 601 that may be used in implementing one or more of the methods, tools, and modules, and any related functions, described herein (e.g., using one or more processor circuits or computer processors of the computer), in accordance with some embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602-1, 602-2, 602-3, 602-N, herein collectively referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

A cloud computing environment is service oriented with a focus on statelessness, low coupling, modularity, and semantic interoperability. At the heart of cloud computing is an infrastructure that includes a network of interconnected nodes. The system 601 may be employed in a cloud computing environment.

Figure 7:
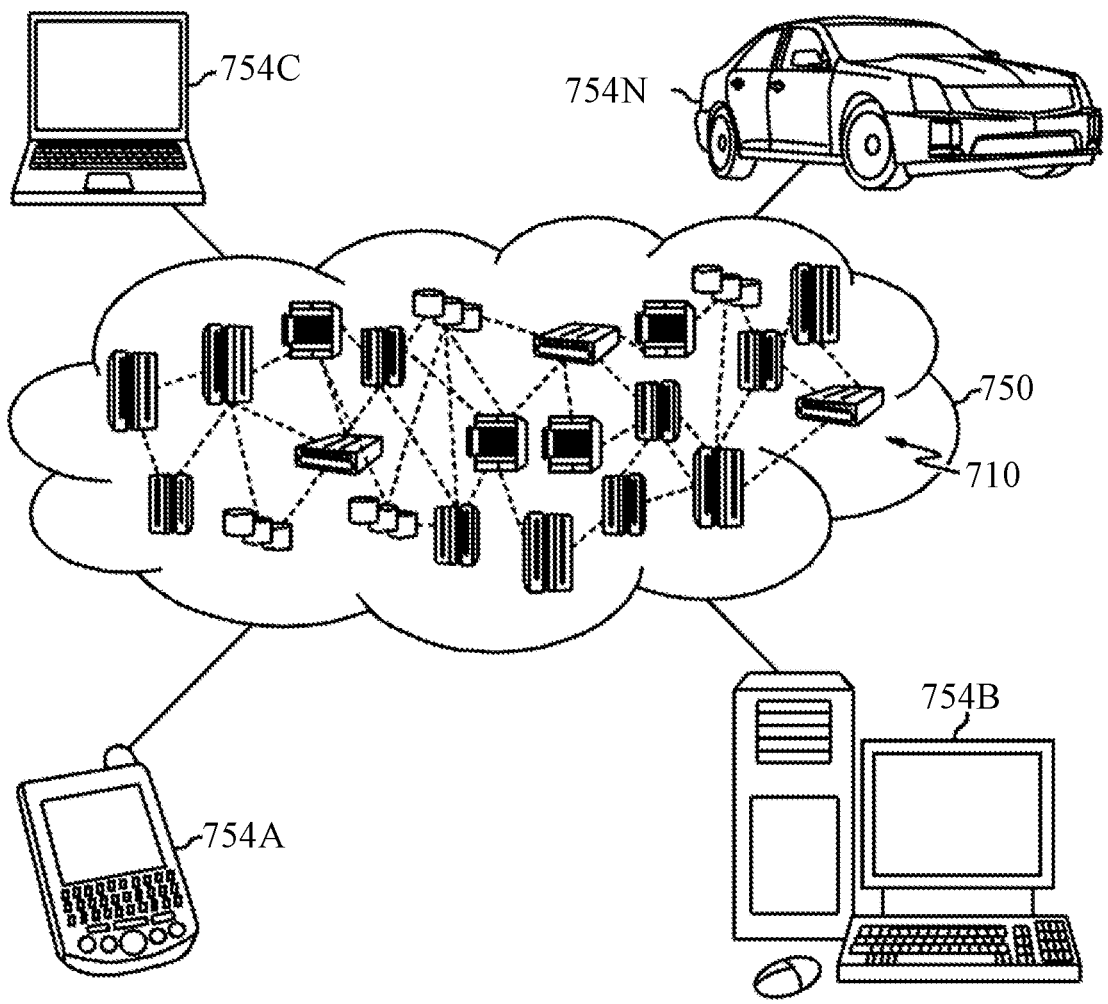
FIG. 7 is a schematic diagram illustrating a cloud computing environment, in accordance with some embodiments of the present disclosure.

Referring to FIG. 7, a schematic diagram is provided illustrating a cloud computing environment 750, in accordance with some embodiments of the present disclosure. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 may communicate with any type of computerized device over any type of network and/or network addressable connection (e.g., using a web browser).

Figure 8:
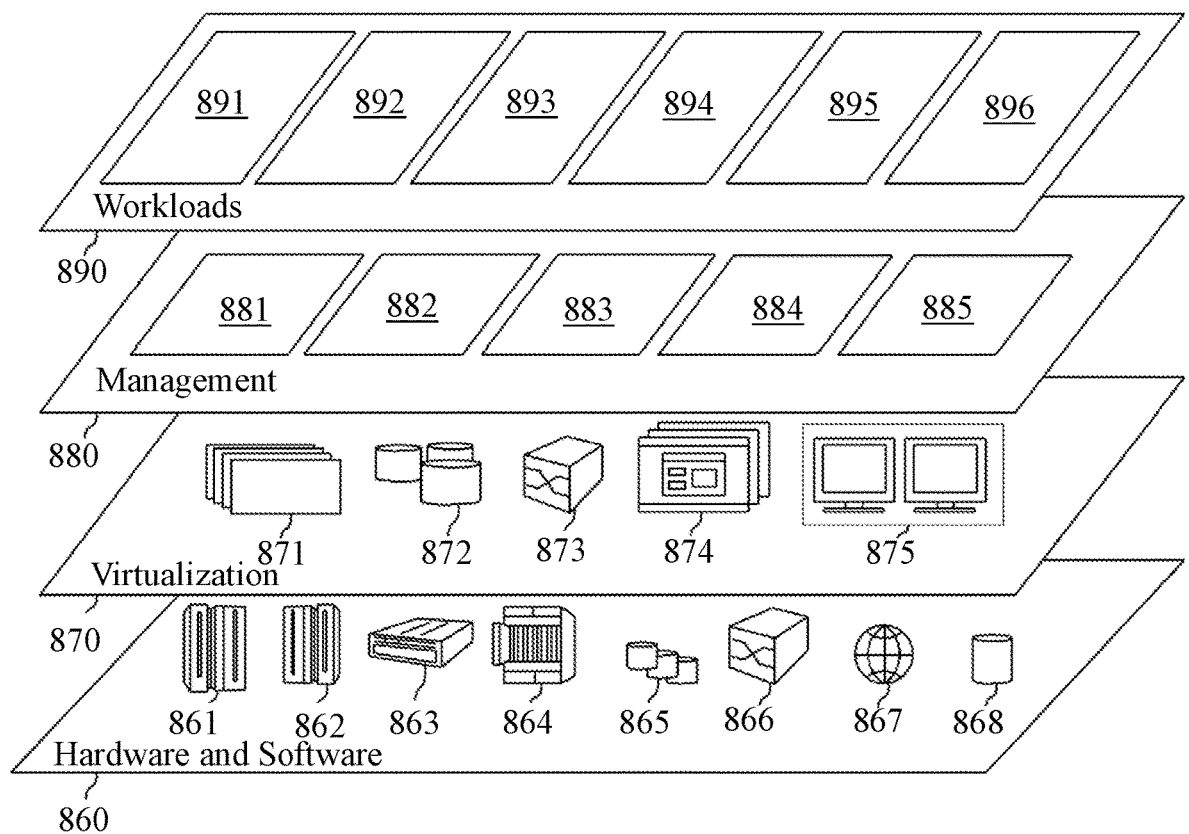
FIG. 8 is a schematic diagram illustrating a set of functional abstraction model layers provided by the cloud computing environment, in accordance with some embodiments of the present disclosure.

Referring to FIG. 8, a schematic diagram is provided illustrating a set of functional abstraction model layers provided by the cloud computing environment 750 (FIG. 7), in accordance with some embodiments of the present disclosure. It should be understood in advance that the components, layers, and functions shown in FIG. 8 are intended to be illustrative only and embodiments of the disclosure are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; layout detection 893; data analytics processing 894; transaction processing 895; and proactively initiating throttle action on the cores in a multicore processing device to mitigate and/or prevent voltage droop 896.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for proactively initiating a throttle action on one or more cores in a multicore processing device to mitigate voltage droop comprising:

one or more memory devices communicatively and operably coupled to the multicore processing device;
a predictive voltage droop management system at least partially embedded within the one or more memory devices, the predictive voltage droop management system comprising one or more core throttling circuits;
the predictive voltage droop management system is configured to:
  determine, in real-time, one or more stall events within the one or more cores;
  determine one or more resolutions of the one or more stall event;
  determine, in real-time, a timing margin value for the one or more cores;
  predict inducement of a voltage droop on the one or more cores comprising:
    integration of the one or more resolutions of the one or more stall events and the timing margin value for the one or more cores;
  determine, subject to the prediction, a throttle action for the one or more cores; and
  execute, through the one or more core throttling circuits, the throttle action on the one or more cores.

2. The system of claim 1, wherein the predictive voltage droop management system is further configured to:
  determine, subject to the one or more resolutions of the one or more stall events, the timing margin value with respect to a predetermined threshold value through a predetermined number of cycles.

3. The system of claim 2, wherein the predictive voltage droop management system is further configured to:
  determine the timing margin value is below the predetermined threshold value; and
  suspend, through the one or more core throttling circuits, execution of presently pending instructions in all of the cores of the multicore processing device.

4. The system of claim 2, wherein the predictive voltage droop management system is further configured to:
  determine the timing margin value is above the predetermined threshold value; and
  prevent initiation of any throttle action on the one or more cores for a duration of the one or more stall events.

5. The system of claim 1, wherein the predictive voltage droop management system is further configured to:
  determine one or more historical electric power consumption values for the one or more cores;
  determine one or more historical voltage measurement values of the one or more cores; and
  integrate the one or more historical electric power consumption values and the one or more historical voltage measurement values with the one or more resolutions of the one or more stall events and the timing margin value for the one or more cores.

6. The system of claim 5, wherein the predictive voltage droop management system is further configured to:
  determine the timing margin value is below a predetermined threshold value;
  determine, subject to the integration of the one or more historical electric power consumption values and the one or more historical voltage measurement values, a low power condition in the one or more cores; and
  suspend, through the one or more core throttling circuits, execution of presently pending instructions in all of the cores of the multicore processing device.

7. The system of claim 1, wherein the predictive voltage droop management system is further configured to:
  determine the one or more stall events are selected from one or more predefined events, wherein the one or more predefined events are determined to increase a power consumption during execution thereof.

8. A computer program product embodied on at least one computer readable storage medium having computer executable instructions for proactively initiating a throttle action on one or more cores in a multicore processing device to mitigate voltage droop that when executed cause one or more computing devices to:
  determine, in real-time, one or more stall events within the one or more cores;
  determine one or more resolutions of the one or more stall events;
  determine, in real-time, a timing margin value for the one or more cores;
  predict inducement of a voltage droop on the one or more cores comprising:
    integration of the one or more resolutions of the one or more stall events and the timing margin value for the one or more cores;
  determine, subject to the prediction, a throttle action for the one or more cores; and
  execute the throttle action on the one or more cores.

9. The computer program product of claim 8, further having computer executable instructions to:
  determine, subject to the one or more resolutions of the one or more stall events, the timing margin value with respect to a predetermined threshold value through a predetermined number of cycles.

10. The computer program product of claim 9, further having computer executable instructions to:
  determine the timing margin value is below the predetermined threshold value; and
  suspend execution of presently pending instructions in all of the cores of the multicore processing device.

11. The computer program product of claim 9, further having computer executable instructions to:
  determine the timing margin value is above the predetermined threshold value; and
  prevent initiation of any throttle action on the one or more cores for a duration of the one or more stall events.

12. The computer program product of claim 8, further having computer executable instructions to:
  determine one or more historical electric power consumption values for the one or more cores;
  determine one or more historical voltage measurement values of the one or more cores; and
  integrate the one or more historical electric power consumption value and the one or more historical voltage measurement values with the one or more resolutions of the one or more stall events and the timing margin value for the one or more cores.

13. The computer program product of claim 12, further having computer executable instructions to:
  determine the timing margin value is below a predetermined threshold value;
  determine, subject to the integration of the one or more historical electric power consumption values and the one or more historical voltage measurement values, a low power condition in the one or more cores; and
  suspend, through the one or more core throttling circuits, execution of presently pending instructions in all of the cores of the multicore processing device.

14. A computer-implemented method for proactively initiating a throttle action on one or more cores in a multicore processing device to mitigate voltage droop therein comprising:
   determining, in real-time, one or more stall events within the one or more cores;
   determining one or more resolutions of the one or more stall events;
   determining, in real-time, a timing margin value for the one or more cores;
   predicting inducement of a voltage droop on the one or more cores comprising:
      integrating the one or more resolutions of the one or more stall events and the timing margin value for the one or more cores;
   determining, subject to the predicting, a throttle action for the one or more cores; and
   executing the throttle action on the one or more cores.

15. The method of claim 14, wherein the predicting inducement of a voltage droop comprises:
   determining, subject to the one or more resolutions of the one or more stall events, the timing margin value with respect to a predetermined threshold value through a predetermined number of cycles.

16. The method of claim 15, wherein:
   the determining a throttle action for the one or more cores further comprises:
      determining the timing margin value is below the predetermined threshold value; and
   the executing the throttle action on the one or more cores comprises:
      suspending execution of presently pending instructions in all of the cores of the multicore processing device.

17. The method of claim 15, wherein:
   the determining a throttle action for the one or more cores further comprises:
      determining the timing margin value is above the predetermined threshold value; and
   the executing the throttle action on the one or more cores comprises:
      preventing initiation of any throttle action on the one or more cores for a duration of the one or more stall events.

18. The method of claim 14, further comprising:
   determining one or more historical electric power consumption values for the one or more cores;
   determining one or more historical voltage measurement values of the one or more cores; and
   integrating the one or more historical electric power consumption value and the one or more historical voltage measurement values with the one or more resolutions of the one or more stall events and the timing margin value for the one or more cores.

19. The method of claim 18, wherein:
   the determining a throttle action for the one or more cores further comprises:
      determining the timing margin value is below a predetermined threshold value; and
      determining, subject to the integrating of the one or more historical electric power consumption values and the one or more historical voltage measurement values, a low power condition in the one or more cores; and
   the executing the throttle action on the one or more cores comprises:
      suspending execution of presently pending instructions in all of the cores of the multicore processing device.

20. The method of claim 14, wherein the determining an indication of one or more stall events comprises:
   determining the one or more stall events are selected from one or more predefined events, wherein the one or more predefined events are determined to increase a power consumption during execution thereof.

* * * * *